(12) United States Patent
Oami

(10) Patent No.: US 6,278,737 B1
(45) Date of Patent: Aug. 21, 2001

(54) REVERSIBLE CODING SYSTEM FOR INTERLACED SCANNED MOVING PICTURES

(75) Inventor: Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/108,727

(22) Filed: Jul. 1, 1998

(30) Foreign Application Priority Data

Jul. 4, 1997 (JP) .................................................... 9-195101

(51) Int. Cl.⁷ ...................................................... H04N 7/12
(52) U.S. Cl. .......................................................... 375/240.2
(58) Field of Search ......................... 375/240.01, 240.18, 375/240.2, 240.24; H04N 7/12

(56) References Cited

FOREIGN PATENT DOCUMENTS 8-102950    4/1996   (JP) .

Primary Examiner—Young Lee
(74) Attorney, Agent, or Firm—Ostrolenk, Faber, Gerb & Soffen, LLP

(57) ABSTRACT

The invention provides a reversible coding system for an interlaced scanned moving picture based on reversible discrete cosine transform which controls selection of frame/field discrete cosine transform so as to assure a high degree of compatibility with an ordinary discrete cosine transform coding system. A motion compensated predictive error is detected from an input signal, and a frame-scan block and a field-scan block are produced for each block of the input signal by a frame/field scan production circuit. One of the blocks is selected by a switch, and reversible discrete cosine transform is performed for the selected block. Upon the selection, first and second estimated error calculation circuits estimate error amounts when reversible discrete cosine transform is performed for the frame- and field-scan blocks and then inverse discrete cosine transform is performed for the resultant blocks. The error amounts are compared with each other, and the lower one of them is selected by a comparator.

1 Claim, 8 Drawing Sheets

REVERSIBLE CODING SYSTEM FOR INTERLACED SCANNED MOVING PICTURES

BACKGROUND OF THE INVENTION

1. Field of the Invention

The present invention relates to a picture processing system, and more particularly to reversible transform coding for interlaced scanned moving pictures.

2. Description of the Related Art

Various reversible coding systems for moving pictures are conventionally known, and one of reversible coding systems of the type mentioned has been proposed by the inventor of the invention of the present application (the reversible coding system is hereinafter referred to as prior art by the inventor). The prior art by the inventor is directed to a reversible coding system for pictures which is based on discrete cosine transform and allows reversible coding by modifying ordinary discrete cosine transform. A reversible moving picture coding system can be implemented by applying the reversible coding system for pictures to a coding algorithm of the MPEG-2 (Moving Picture Experts Group-Phase 2).

MPEG-2 coding originally is non-reversible coding. However, MPEG-2 coding is non-reversible only at the quantization part thereof. The entire coding can be made reversible coding by replacing the discrete cosine transform and quantization parts with reversible discrete cosine transform. In the prior art by the inventor, a reversible moving picture coding system is implemented by the countermeasure just described.

FIG. 7 shows in block diagram a construction of an encoder which effects reversible moving picture coding.

Referring to FIG. 7, a motion estimation circuit 5 effects motion estimation between a picture coded in the past and a picture of an object of coding and outputs a motion vector for each macro block. A predictor 4 produces a motion compensated predictive picture from the reference picture in accordance with motion vectors outputted from the motion estimation circuit 5 and outputs the motion compensated predictive picture. An adder 3 subtracts the motion compensated predictive picture outputted from the predictor 4 from the coding object picture to produce a predictive error picture. A reversible discrete cosine transform (lossless DCT; LDCT) circuit 1 performs reversible discrete cosine transform for the predictive error picture outputted from the adder 3 for each block and outputs transform coefficients.

It is to be noted that the encoder shown in FIG. 7 does not include a local decoding loop which is included in an ordinary MPEG-2 encoder. This is because, in reversible coding, a locally decoded picture coincides completely with the original picture and no local decoding is required.

In the MPEG-2, an object of coding is an interlaced scanned moving picture. When discrete cosine transform is performed, either field scanned blocks, that is, blocks obtained by interlaced scanning, or frame-scanned blocks, that is, progressively scanned blocks, can be selected. As a selection controlling method for such selection, for example, a method of the MPEG-2 TM-5 (Test Model 5) or another method disclosed in Japanese Patent Laid-Open Application No. Heisei 8-102950 (title of the invention: Coding Apparatus and Motion Discrimination Method) is known.

In the MPEG-2 TM-5, a correlation coefficient of pixel values is determined for each macro block between fields to effect selection of frame-scanning or field-scanning. The magnitude of the correlation coefficient is discriminated with a threshold value, and if the correlation coefficient is higher than the threshold value, then frame-scanning is selected, but in any other case, field-scanning is selected to effect discrete cosine transform.

In the coding apparatus disclosed in Japanese Patent Laid-Open Application No. Heisei 8-102950 mentioned above, a difference in pixel value is determined for each block between fields, and selection between frame discrete cosine transform and field discrete cosine transform is controlled based on an absolute value of a sum when such differences are added in a vertical direction. More particularly, an absolute value of a difference sum described above is determined for each column first. Then, the absolute values of the difference sums of the columns are added to determine a sum total, and the sum total is compared with the threshold value. Simultaneously, a maximum value among the absolute values of the difference sums of the columns is determined, and the maximum value is compared with the threshold value. Then, if both of the sum total and the maximum value are higher than the threshold value, then field discrete cosine transform is selected, but in any other case, frame discrete cosine transform is selected.

The selection control described above can be incorporated into the system shown in FIG. 7. In particular, frame discrete cosine transform and field discrete cosine transform can be adaptively changed over using the prior art by the inventor. The applied system is shown in FIG. 8.

Referring to FIG. 8, a frame/field adaptive-scanned block production circuit 6 adaptively selects field scanning or frame scanning based on a conventional system from a predictive error picture outputted from the adder 3 to produce a block and outputs the thus produced block.

However, even if the system of the MPEG-2 TM-5 or the system disclosed in Japanese Patent Laid-Open Application No. Heisei 8-120950 mentioned hereinabove is combined with the prior art by the inventor, a desired result cannot necessarily be obtained from the point of view of compatibility between a reversible discrete cosine transform coding system and a conventional discrete cosine transform coding system. Here, the compatibility signifies a matter of which degree of picture quality is obtained when a picture coded using reversible discrete cosine transform is decoded by ordinary inverse discrete cosine transform. It is considered that the higher the picture quality obtained then, the superior in compatibility the reversible discrete cosine transform coding system.

The reason why a desirable result cannot be obtained is that the conventional adaptive selection system between frame discrete cosine transform and field discrete cosine transform is optimized in terms of reduction of the code amount where ordinary discrete cosine transform is used, and does not take augmentation in compatibility into consideration. Conversely speaking, the selection system can be re-examined from the point of view of augmentation of the compatibility.

SUMMARY OF THE INVENTION

It is an object of the present invention to provide a reversible moving picture coding system wherein, where reversible discrete cosine transform is applied to the MPEG-2, selection control of frame/field discrete cosine transform is modified to augment the compatibility between a reversible discrete cosine transform coding system and a conventional discrete cosine transform coding system. More particularly, the object of the present invention is to provide a reversible moving picture coding system by which a decoded signal of an augmented quality is obtained when a picture coded using reversible discrete cosine transform is decoded using ordinary inverse discrete cosine transform or when a picture coded using ordinary discrete cosine transform is decoded using reversible inverse discrete cosine transform.

In order to attain the object of the present invention, according to an aspect of the present invention, there is provided a reversible moving picture coding system, comprising means for determining a motion vector from an interlaced scanned input video signal, means for producing a motion compensated predictive picture from a picture for reference using the motion vector, means for subtracting the motion compensated predictive picture from the input video signal to produce a predictive error picture, means for producing a frame-scanned block and a field-scanned block from the predictive error signal, means for estimating an error amount when reversible discrete cosine transform is performed for the frame-scanned block and then ordinary inverse discrete cosine transform is performed for the resultant block on the decoding side and outputting the estimated error amount as an estimated error amount for a frame-scanned block, means for estimating an error amount when reversible discrete cosine transform is performed for the field-scanned block and then ordinary inverse discrete cosine transform is performed for the resultant block on the decoding side and outputting the estimated error amount as an estimated error amount for a field-scanned block, means for comparing the estimated error amount for the frame-scanned block and the estimated error amount for the field-scanned block with each other to produce a scan selection signal and outputting the scan selection signal, means for selecting one of the frame-scanned block and the field-scanned block in accordance with the scan selection signal and outputting the selected scanned block as an adaptive-scanned block, and means for performing reversible discrete cosine transform for the adaptive-scanned block to produce an adaptive-scan transform coefficient block.

According to another aspect of the present invention, there is provided a reversible moving picture coding system, comprising means for determining a motion vector from an interlaced scanned input video signal, means for producing a motion compensated predictive picture from a picture for reference using the motion vector, means for subtracting the motion compensated predictive picture from the input video signal to produce a predictive error picture, means for producing a first frame-scanned block and a first field-scanned block from the predictive error picture, means for performing reversible discrete cosine transform for the first frame-scanned block to produce a frame-scan transform coefficient block and outputting the frame-scan transform coefficient block, means for performing reversible discrete cosine transform for the first field-scanned block to produce a field-scan transform coefficient block and outputting the field-scan transform coefficient block, means for selecting one of the frame-scan transform coefficient block and the field-scan transform coefficient block in accordance with a scan selection signal and outputting the selected transform coefficient block as an adaptive-scan transform coefficient block, means for performing ordinary inverse discrete cosine transform for the frame-scan transform coefficient block, locally decoding a result of the ordinary inverse discrete cosine transform using the motion vector to produce a frame-scan decoded block and outputting the frame-scan decoded block, means for performing ordinary inverse discrete cosine transform for the field-scan transform coefficient block, locally decoding a result of the ordinary inverse discrete cosine transform using the motion vector to produce a field-scan decoded block and outputting the field-scan decoded block, means for producing a second frame-scanned block and a second field-scanned block from the input video signal, means for determining an error between the frame-scan decoded block and the second frame-scanned block to calculate an error amount for a frame-scanned block and outputting the error amount for the frame-scanned block, means for determining an error between the field-scan decoded block and the second field-scanned block to calculate an error amount for a field-scanned block and outputting the error amount for the field-scanned block, and means for comparing the error amount for the frame-scanned block and the error amount for the field-scanned block to produce the scan selection signal and the outputting the scan selection signal.

According to a further aspect of the present invention, there is provided a reversible moving picture coding system, comprising means for determining a motion vector from an interlaced scanned input video signal, means for producing a first motion compensated predictive picture from a picture for reference using the motion vector, means for subtracting the first motion compensated predictive picture from the input video signal to produce a predictive error picture, means for producing first frame-scanned blocks and first field-scanned blocks from the predictive error picture, means for selecting one of the first frame-scan transform coefficient block and the first field-scan transform coefficient block in accordance with a scan selection signal and outputting the selected transform coefficient block as an adaptive-scan transform coefficient block, means for performing reversible discrete cosine transform for the adaptive-scanned block to produce an adaptive-scan transform coefficient block, means for performing linear operation for the first frame-scanned block to estimate a predictive error when the first frame-scanned block is reversible transform cosine transformed and then ordinary inverse discrete cosine transformed on the decoding side and outputting the predictive error as a frame-scan estimated predictive error block, means for performing linear operation for the first field-scanned block to estimate a predictive error when reversible transform cosine transform is performed for the first field-scanned block and then ordinary inverse discrete cosine transform is performed for the resultant block on the decoding side and outputting the predictive error as a field-scan estimated predictive error block, means for transforming the adaptive-scan transform coefficient block by ordinary inverse discrete cosine transform and producing and outputting a second motion compensated predictive picture using the motion vector, means for producing a frame-scan predictive block and a field-scan predictive block from the second motion compensated predictive picture, means for adding the frame-scan predictive block to the frame-scan estimated predictive error block to produce a frame-scan estimated block, means for adding the field-scan predictive block to the field-scan estimated predictive error block to produce a field-scan estimated block, means for producing a second frame-scanned block and a second field-scanned block from the input video signal, means for determining an error between the second frame-scanned block and the frame-scan estimated block and calculating and outputting an estimated error amount for a frame-scanned block, means for determining an error between the second field-scanned block and the field-scan estimated block and calculating and outputting an estimated error amount for a field-scanned block, and means for comparing the estimated error amount for the frame-scanned block and the estimated error amount for the field-scanned block to produce the scan selection signal and the outputting the scan selection signal.

According to a still further aspect of the present invention, there is provided a reversible moving picture coding system, comprising means for determining a motion compensated predictive error from an input picture signal and producing a frame-scanned block and a field-scanned block from the motion compensated predictive error for each block, means for estimating error amounts when reversible discrete cosine transform is performed for the frame-scanned block and the field-scanned block and then ordinary inverse discrete cosine transform is performed for the resultant blocks on the decoding side and selecting that one of the blocks whose estimated error amount is the smaller than the other estimated error amount, and means for performing reversible discrete cosine transform for the selected scanned block.

With the reversible moving picture coding systems, since selection between frame discrete cosine transform and field discrete cosine transform is modified to a method which is preferable for the compatibility between a reversible discrete cosine transform coding system and a conventional discrete cosine transform coding system, an advantage that the compatibility is augmented can be achieved. More particularly, with the reversible moving picture coding system, even when a picture coded using reversible discrete cosine transform is decoded using conventional inverse discrete cosine transform, a higher picture quality than those achieved by conventional systems can be achieved.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
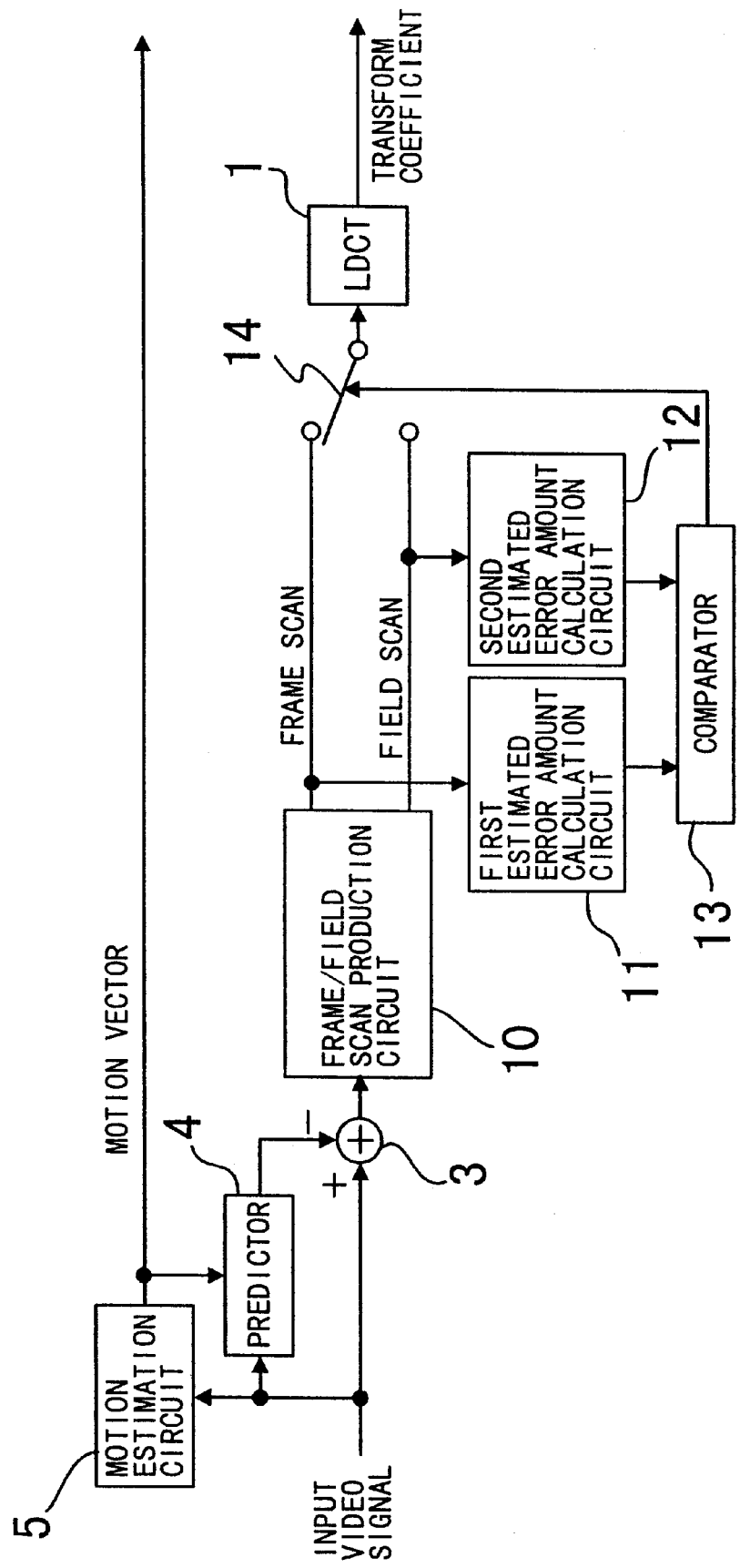
FIG. 1 is a block diagram showing a construction of a reversible moving picture coding system to which the present invention is applied.

Referring first to FIG. 1, there is shown in block diagram a circuit construction of a reversible moving picture coding system to which the present invention is applied. A motion estimation circuit 5 effects motion estimation for an input video signal and outputs motion vectors. A predictor 4 produces a motion compensated predictive picture from a reference picture using the motion vectors determined by the motion estimation circuit 5. An adder 3 subtracts the motion compensated predictive picture from a coding object picture of the input video signal to produce a predictive error picture. A frame/field scan production circuit 10 produces frame-scanned blocks and field-scanned blocks from the predictive error picture.

A first estimated error amount calculation circuit 11 estimates, from the frame-scanned block, an error when the block is coded using reversible discrete cosine transform and then decoded using ordinary inverse discrete cosine transform, and calculates an estimated error amount of the frame-scanned block from the error. A second estimated error amount calculation circuit 12 estimates, from the field-scanned block, an error when the block is coded using reversible discrete cosine transform and then decoded using ordinary inverse discrete cosine transform, and calculates an estimated error amount of the field-scanned block from the error. A comparator 13 compares the estimated error amount of the frame-scanned block and the estimated error amount of the field-scanned block with each other and outputs a scan selection signal. A switch 14 selects one of the frame-scanned block and the field-scanned block using the scan selection signal as a switching control signal. Then, a reversible discrete cosine transform (lossless DCT; LDCT) circuit 1 performs reversible discrete cosine transform for the selected block and outputs transform coefficients.

In operation, an input video signal is divided in frames, and such frames are inputted in an order in which they are to be coded. A coding object picture of the input video signal is inputted to the motion estimation circuit 5. The motion estimation circuit 5 performs motion compensation for the coding object picture with a reference picture to calculate motion vectors and outputs the motion vectors.

Using the motion vectors, the predictor 4 produces a motion compensated predictive picture from the reference picture. Then, the predictive picture is subtracted from the coding object picture by the adder 3 to produce a predictive error picture. The predictive error picture is inputted to the frame/field scan production circuit 10, by which frame-scanned blocks and field-scanned blocks are produced for each macro block.

The following processes are performed in units of a block. A frame-scanned block and a field-scanned block are inputted to the first estimated error amount calculation circuit 11 and the second estimated error amount calculation circuit 12, by which an estimated error amount for the frame-scanned block and an estimated error amount for the field-scanned block are calculated, respectively. The estimated error amounts are estimated amounts of errors when the blocks are coded using reversible discrete cosine transform and then decoded using ordinary inverse discrete cosine transform. In the following, a calculation method for them is described.

Where a matrix obtained by normalizing row vectors of a transform matrix of reversible discrete cosine transform is represented by A and a matrix composed of pixel values of a block is represented by X, a transform coefficient obtained by reversible discrete cosine transform of the block has a value proximate to the following expression (1):

$$AXA^T \qquad (1)$$

Here, where the original matrix representative of discrete cosine transform is represented by C, the following expression (2)

$$C^{-1}AXA^T(C^{-1})^T = C^{-1}AX(C^{-1}A)^T \qquad (2)$$

represents a result of ordinary inverse discrete cosine transform performed for the expression (1) above.

Consequently, the following expression (3)

$$C^{-1}AX(C^{-1}A)^T - X \qquad (3)$$

is considered to be approximate to an error when reversible discrete cosine transform is performed and then ordinary inverse discrete cosine transform is performed for the block X.

Thus, an estimated error amount can be calculated from the value of the expression (3) above. If, for example, a mean-square error of the block is used as the error amount, then a mean-square of the individual elements of the expression (3) above should be determined to calculate an estimated error amount.

The estimated error amount for the field-scanned block and the estimated error amount the frame-scanned block calculated in this manner are inputted to the comparator 13, by which the values thereof are compared with each other. The comparator 13 thus outputs a signal representative of a relationship in magnitude between the estimated error amounts, that is, a scan selection signal. In accordance with the scan selection signal, one of the frame-scanned block and the field-scanned block is selected by the switch 14. Here, that one of the blocks whose estimated error amount is determined to be smaller as a result of the comparison of the comparator 13 is selected.

For the block selected by the switch 14, reversible discrete cosine transform is performed by the reversible discrete cosine transform circuit 1 to determine a transform coefficient. Transform coefficients of the individual blocks are calculated in this manner. It is to be noted that information representative of which one of frame-scanning and field-scanning is selected for each block is coded as header information.

As described above, in the reversible moving picture coding system of the first embodiment of the present invention, an error when reversible discrete cosine transform is used for coding and ordinary inverse discrete cosine transform is used for decoding is estimated, and that scanning which is estimated to provide the smaller error is selected for each block to effect coding of the block. Consequently, the compatibility between reversible discrete cosine transform coding and ordinary discrete cosine transform coding is augmented.

Figure 2:
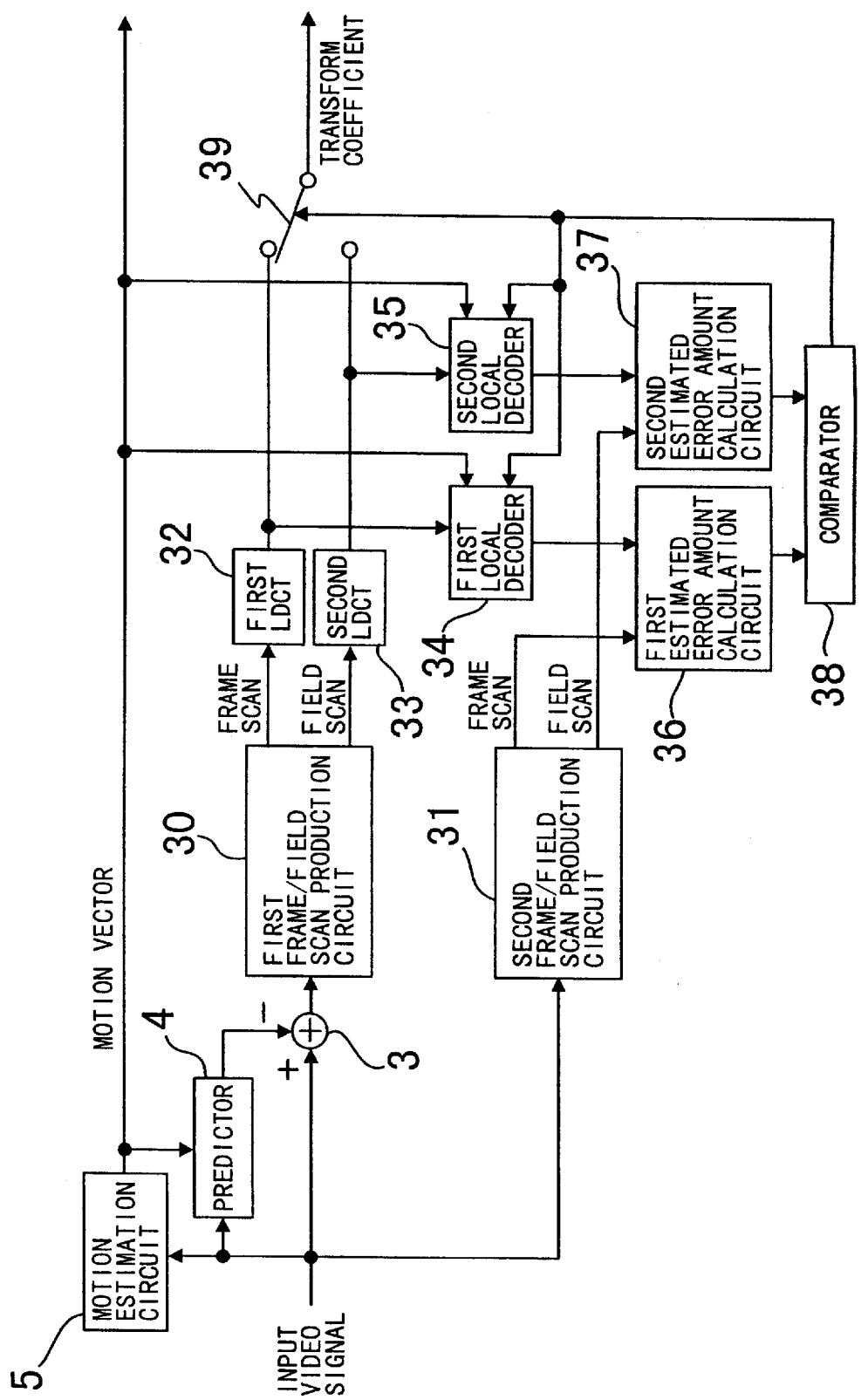
FIG. 2 is a similar view but showing a construction of another reversible moving picture coding system to which the present invention is applied.

FIG. 2 shows in block diagram a circuit construction of another reversible moving picture coding system to which the present invention is applied. Referring to FIG. 2, the reversible moving picture coding system shown includes a motion estimation circuit 5, a predictor 4 and an adder 3 which are all similar to those of the reversible moving picture coding system of the first embodiment described above with reference to FIG. 1. Thus, overlapping description of the common components is omitted here to avoid redundancy.

A first frame/field scan production circuit 30 produces frame-scanned blocks and field-scanned blocks from a predictive error picture outputted from the adder 3. A first reversible discrete cosine transform circuit 32 performs reversible discrete cosine transform for the frame-scanned block and outputs a frame-scan transform coefficient block. A second reversible discrete cosine transform circuit 33 performs reversible discrete cosine transform for the field-scanned block and outputs a field-scan transform coefficient block. A first local decoder 34 decodes the frame-scan transform coefficient block using a motion vector determined by the motion estimation circuit 5 and outputs a frame-scan decoded block. A second local decoder 35 decodes the field-scan transform coefficient block using the motion vector determined by the motion estimation circuit 5 and outputs a field-scan decoded block.

A second frame/field scan production circuit 31 produces frame-scanned blocks and field-scanned blocks from a coding object picture of an input video signal. A first error amount calculation circuit 36 determines an error between the frame-scanned block outputted from the second frame/field scan production circuit 31 and the frame-scan decoded block to calculate an error amount and outputs the error amount. A second error amount calculation circuit 37 determines an error between the field-scanned block outputted from the second frame/field scan production circuit 31 and the field-scan decoded block to calculate an error amount and outputs the error amount A comparator 38 compares the error amounts outputted from the first error amount calculation circuit 36 and the second error amount calculation circuit 37 with each other and outputs a scan selection signal. A switch 39 selects one of the frame-scan transform coefficient block and the field-scan transform coefficient block.

In operation, motion vectors are calculated from an input video signal by the motion estimation circuit 5, and a motion compensated predictive picture is produced by the predictor 4. Then, the predictive picture is subtracted from a coding object picture by the adder 3 to produce a predictive error picture. The operations just described are same as those of the reversible moving picture coding system of the first embodiment described hereinabove with reference to FIG. 1.

From the predictive error picture produced in such a manner as described above, frame-scanned blocks and field-scanned blocks are produced by the first frame/field scan production circuit 30 in a similar manner as by the frame/field scan production circuit 10 shown in FIG. 1. The following processes are performed in units of a block.

For the frame-scanned block and the field-scanned block, reversible discrete cosine transform is performed by the first reversible discrete cosine transform circuit 32 and the second reversible discrete cosine transform circuit 33 so that a frame-scan transform coefficient block and a field-scan transform coefficient block are produced by them, respectively. Then, one of the two transform coefficient blocks is selected in accordance with a scan selection signal which will be hereinafter described by the switch 39 and is outputted as an adaptive-scan transform coefficient block.

Now, production of the scan selection signal is described. First, the frame-scan transform coefficient block and the field-scan transform coefficient block outputted from the first reversible discrete cosine transform circuit 32 and second reversible discrete cosine transform circuit 33 are inputted to the first local decoder 34 and the second local decoder 35, by which a frame-scan decoded block and a field-scan decoded block are produced, respectively. The first and second local decoders 34 and 35 have such a common construction as shown in FIG. 4.

Figure 4:
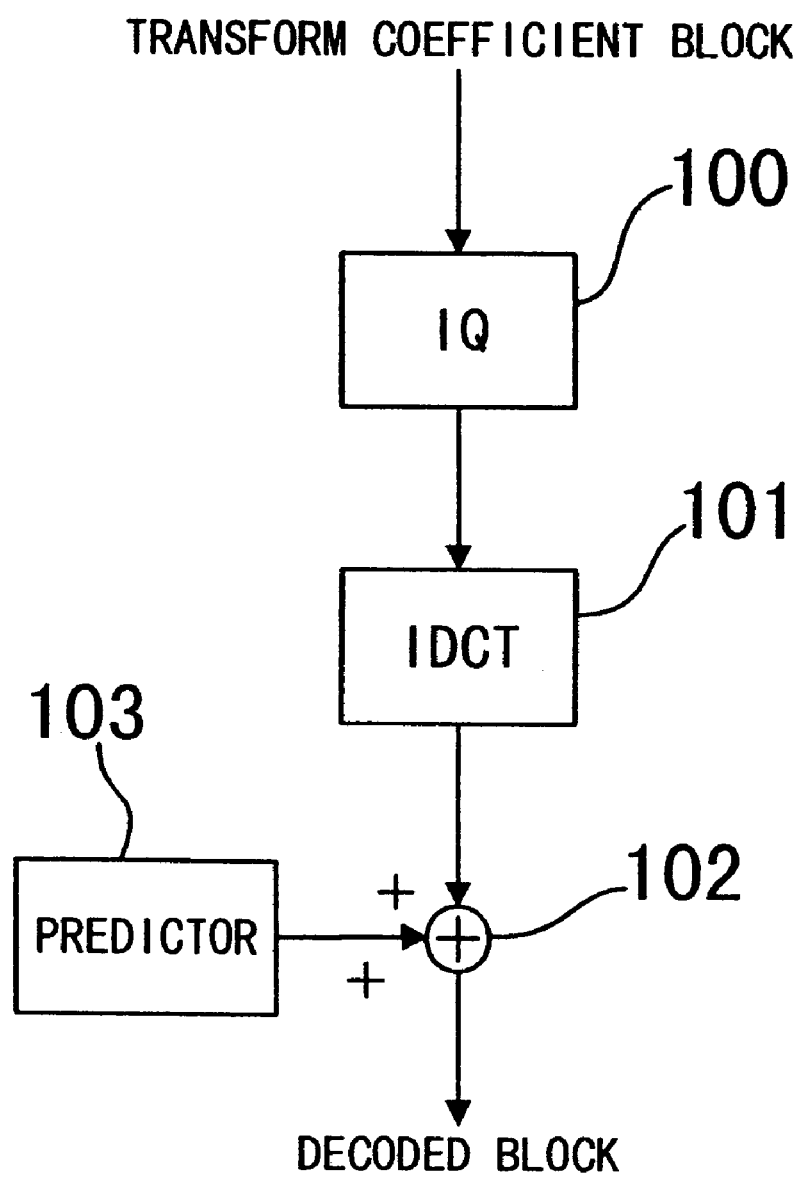
FIG. 4 is a block diagram showing an example of a construction of first and second local decoding circuits of the reversible moving picture coding system of FIG. 2.

Referring to FIG. 4, a transform coefficient block inputted to the local decoder shown is first dequantized by a dequantizer 100 and then inverse discrete cosine transform is performed for the resultant block by an inverse discrete cosine transform (IDCT) circuit 101. Then, a predictive block outputted from a predictor 103 is added to a result of the inverse discrete cosine transform of the inverse discrete cosine transform circuit 101 by an adder 102 to produce a decoded block, and the thus produced decoded block is outputted from the local decoder. The predictor 103 produces the predictive block from a locally decoded reference picture stored therein using the motion vector outputted from the motion estimation circuit 5.

In this instance, if the input to the local decoder is a frame-scanned block, then the local decoder produces a frame-scan predictive block, but if the input to the local decoder is a field-scan block, then the local decoder produces a field-scan predictive block.

It is to be noted that the locally decoded reference pictures stored in the first local decoder 34 and the second local decoder 35 shown in FIG. 2 are the same reference picture. In order to produce the local decoded reference picture, one of a frame-scan decoded block and a field-scan decoded block is selected for each block. Here, which one of them should be selected depends upon the scan selection signal outputted from the comparator 38, and the same one of them that is selected by the switch 39 is selected. Then, the thus produced locally decoded reference picture is used to encode a video signal that will be inputted later.

Referring to FIG. 2, the frame-scan decoded block and the field-scan decoded block outputted from the first local decoder 34 and the second local decoder 35 are inputted to the first error amount calculation circuit 36 and the second error amount calculation circuit 37, respectively. Meanwhile, the second frame/field scan production circuit 31 produces a frame-scanned block and a field-scanned block from the coding object picture of the input video signal in a similar manner as in the first frame/field scan production circuit 30. The frame-scanned block and the field-scanned block are inputted to the first error amount calculation circuit 36 and the second error amount calculation circuit 37, respectively. Each of the first and second error amount calculation circuits 36 and 37 calculates a difference between the two blocks inputted thereto and further calculates an error amount. For example, where a mean-square error is used as the error amount, each of the first and second error amount calculation circuits 36 and 37 calculates and outputs a square-mean between the blocks as an error amount.

The error amounts outputted from the first and second error amount calculation circuits 36 and 37 are inputted to the comparator 38, by which they are compared with each other to discriminate which is larger. The comparator 38 thus outputs a signal representative of the smaller one of the error amounts as a scan selection signal. Then, the block which exhibits the smaller error is selected in accordance with the scan selection signal as described above by the switch 39.

As described above, in the reversible moving picture coding apparatus of the second embodiment of the present invention, for each block, reversible discrete cosine transform is actually performed for both of a frame-scanned block and a field-scanned block and that scanning which exhibits the higher quality of a decoded picture is selected. Accordingly, optimum selection can be performed from the point of view of the compatibility.

Figure 3:
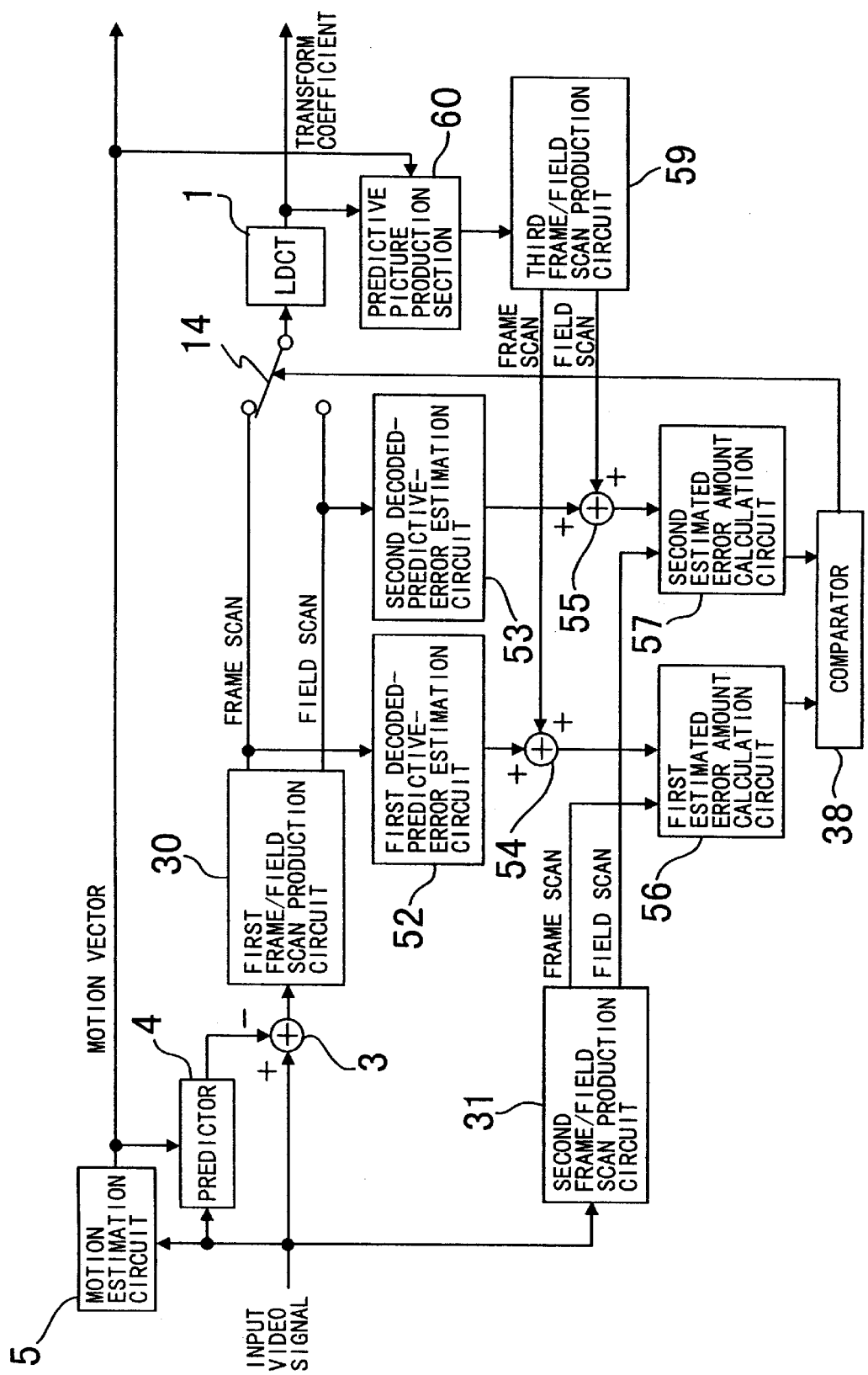
FIG. 3 is a similar view but showing a construction of a further reversible moving picture coding system to which the present invention is applied.

FIG. 3 shows in block diagram a circuit construction of a further reversible moving picture coding system to which the present invention is applied. Referring to FIG. 3, the reversible moving picture coding system shown includes a motion estimation circuit 5, a predictor 4, an adder 3, a reversible discrete cosine transform circuit 1 and a switch 14 which are all similar to those of the reversible moving picture coding system described hereinabove with reference to FIG. 1. The reversible moving picture coding system further includes a first frame/field scan production circuit 30, a second frame/field scan production circuit 31 and a comparator 38 which are all similar to those of the reversible moving picture coding system described hereinabove with reference to FIG. 2. Thus, overlapping description of such common components as those mentioned above is omitted here to avoid redundancy.

A predictive picture production section 60 produces a predictive picture from a transform coefficient block outputted from the reversible discrete cosine transform circuit 1 using motion vectors outputted from the motion estimation circuit 5.

A third frame/field scan production circuit 59 produces and outputs a frame-scan predictive block and a field-scan predictive block from the predictive picture outputted from the predictive picture production section 60.

A first decoded-predictive-error estimation circuit 52 estimates a predictive error when reversible discrete cosine transform is performed for the frame-scanned block outputted from the first frame/field scan production circuit 30 and then ordinary inverse discrete cosine transform is performed for the resultant block on the decoding side, and outputs a frame-scan estimated predictive error block.

A second decoded-predictive-error estimation circuit 53 estimates a predictive error when reversible discrete cosine transform is performed for the field-scanned block outputted from the first frame/field scan production circuit 30 and then ordinary inverse discrete cosine transform is performed for the resultant block on the decoding side, and outputs a field-scan estimated predictive error block.

An adder 54 adds the frame-scan predictive block and the frame-scan estimated predictive error block.

Another adder 55 adds the field-scan predictive block and the field-scan estimated predictive error block.

A first error amount calculation circuit 56 calculates an error amount from the field-scanned block outputted from the second frame/field scan production circuit 31 and an output of the adder 54.

A second error amount calculation circuit 57 calculates an error amount from the frame-scanned block outputted from the second frame/field scan production circuit 31 and an output of the adder 55.

In operation, motion vectors are calculated from an input picture signal by the motion estimation circuit 5, and a motion compensated predictive picture is produced by the predictor 4 and is subtracted from a coding object picture by the adder 3 to produce a predictive error picture. The operations just described are similar to those of the reversible moving picture coding system described hereinabove with reference to FIG. 1.

From the thus produced predictive error picture, a frame-scanned block and a field-scanned block are produced by the first frame/field scan production circuit 30 in a similar manner as in the frame/field scan production circuit 10 described above with reference to FIG. 1. The later processing is performed in units of a block.

One of the frame-scanned block and the field-scanned block outputted from the first frame/field scan production circuit 30 is selected in accordance with a scan selection signal by the switch 14. Further, reversible discrete cosine transform is performed for the selected scanned block by the reversible discrete cosine transform circuit 1. Consequently, an adaptive-scan transform coefficient block is produced by and outputted from the reversible discrete cosine transform circuit 1. The operations just described are similar to those in the reversible moving picture coding system described hereinabove with reference to FIG. 1.

Now, production of the scan selection signal used by the switch 14 is described. First, the frame-scanned block and the field-scanned block outputted from the first frame/field scan production circuit 30 are inputted to the first decoded-predictive-error estimation circuit 52 and the second decoded-predictive-error estimation circuit 53, respectively. Then, a decoded-predictive-error is estimated by each of the first decoded-predictive-error estimation circuit 52 and the second decoded-predictive-error estimation circuit 53, and a frame-scan estimated predictive error block and a field-scan estimated predictive error block are outputted from them, respectively. Here, each of the first and second decoded-predictive-error estimation circuits 52 and 53 estimates a predictive error when reversible discrete cosine transform is performed on the coding side and ordinary inverse discrete cosine transform is performed on the decoding side.

As described above, a value obtained by performing reversible discrete cosine transform for a block X and then performing ordinary inverse discrete cosine transform for the block X is a value proximate to the expression (2) given hereinabove. Consequently, the present circuit performs calculation represented by the expression (2) above for an inputted block to calculate an estimated predictive error block.

Meanwhile, the adaptive-scan transform coefficient block outputted from the reversible discrete cosine transform circuit 1 is inputted to the predictive picture production section 60. The predictive picture production section 60 produces, based on the motion vectors outputted from the motion estimation circuit 5, a motion compensated predictive picture which is considered to be obtained on the decoding side.

Figure 5:
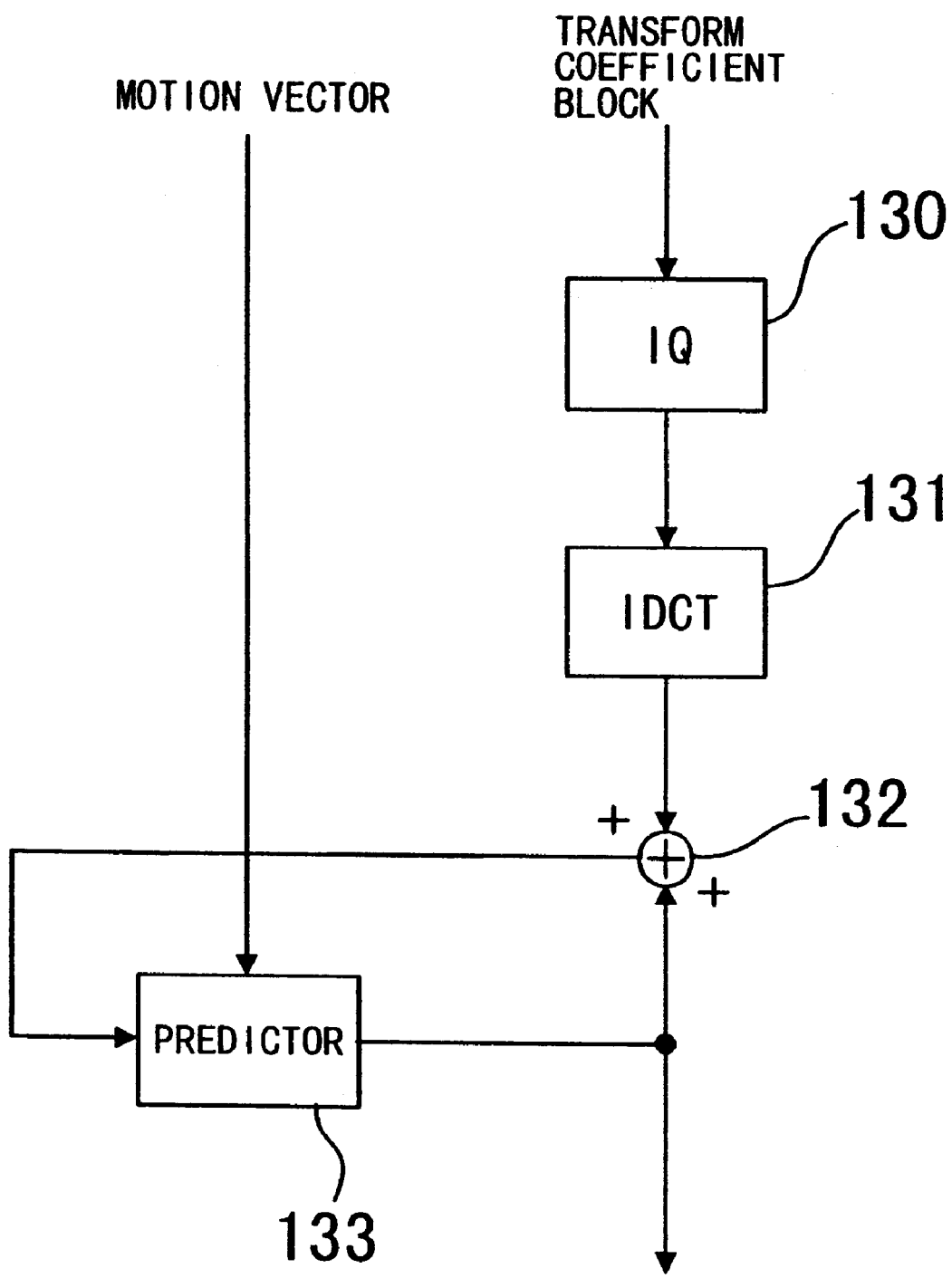
FIG. 5 is a block diagram showing an example of a construction of a predictive picture production unit of a further reversible moving picture coding system to which the present invention is applied.

FIG. 5 shows in block diagram a construction of the predictive picture production section 60. Referring to FIG. 5, in the predictive picture production section 60 shown, an adaptive-scan transform coefficient block inputted is first dequantized by a dequantizer (IQ) 130 and then inverse discrete cosine transform is performed for the resultant block by an inverse discrete cosine transform circuit (IDCT) 131. To a result obtained by the inverse discrete cosine transform, an output of a predictor 133 is added by an adder 132 to obtain a locally decoded picture. The locally decoded picture obtained is stored into the predictor 133. The predictor 133 performs motion compensation using a locally decoded picture stored already therein as a reference picture to produce a motion compensated predictive picture. Then, the motion compensated predictive picture is added to the result of the inverse discrete cosine transform by the adder 132 and simultaneously inputted to the third frame/field scan production circuit 59 shown in FIG. 3.

From the predictive picture produced by performing motion compensation for the local decoded picture stored already in this manner, a frame-scan predictive block and a field-scan predictive block are produced by the third frame/field scan production circuit 59.

Referring back to FIG. 3, the frame-scan predictive block and the field-scan predictive block are added to the frame-scan estimated predictive error block and the field-scan estimated predictive error block by the adders 54 and 55 to obtain a frame-scan estimated block and a field-scan estimated block, respectively. The frame-scan estimated block and the field-scan estimated block are inputted to the first error amount calculation circuit 56 and the second error amount calculation circuit 57, respectively.

Meanwhile, a frame-scanned block and a field-scanned block are produced from the input video signal by the second frame/field scan production circuit 31 and are inputted to the first error amount calculation circuit 56 and the second error amount calculation circuit 57, respectively.

Operations of the first error amount calculation circuit 56 and the second error amount calculation circuit 57 are similar to those of the first error amount calculation circuit 36 and the second error amount calculation circuit 37 described hereinabove with reference to FIG. 2. Outputs of the first error amount calculation circuit 56 and the second error amount calculation circuit 57 are compared in magnitude by the comparator 38, and a scan selection signal is outputted from the comparator 38 in a similar manner as in the reversible moving picture coding system described hereinabove with reference to FIG. 2.

Then, one of the frame-scanned block and the field-scanned block is selected in accordance with the scan selection signal by the switch 14 and is outputted as an adaptive-scanned block as described above.

The reversible moving picture coding system of the third embodiment described above can achieve reduction of the amount of calculation comparing with that of the reversible moving picture coding system of the second embodiment described hereinabove.

In the reversible moving picture coding system of the second embodiment described hereinabove, reversible discrete cosine transform must be performed for both of a frame-scanned block and a field-scanned block. Since reversible discrete cosine transform requires a larger amount of calculation than ordinary discrete cosine transform, it is preferable to minimize the number of times by which reversible discrete cosine transform is performed.

The reversible moving picture coding system of the third embodiment reduces the amount of calculation by approximating reversible discrete cosine transform with linear operation in place of actually performing reversible discrete cosine transform.

The reversible moving picture coding system of the third embodiment exhibits a result somewhat inferior to that of the reversible moving picture coding system of the second embodiment described hereinabove from the point of view of the compatibility since selection control therein partly involves approximation as described above. However, since selection control is performed using a local decoded picture, a result preferable in that the degree of approximation is lower than that of the reversible moving picture coding system of the first embodiment described hereinabove is obtained.

The reversible moving picture coding systems of the first to third embodiments of the present invention described above are described in more detail below. In the reversible moving picture coding systems of the first and third embodiments, linear calculation regarding a matrix $(C^{-1}A)$ is performed as given by the expressions (3) and (2). Where the transform matrix of reversible discrete cosine transform is the following expression (4), $$\begin{bmatrix} 1 & 1 & 1 & 1 & 1 & 1 & 1 & 1 \\ 5 & 4 & 3 & 1 & -1 & -3 & -4 & -5 \\ 12 & 5 & -5 & -12 & -12 & -5 & 5 & 12 \\ 4 & -1 & -5 & -3 & 3 & 5 & 1 & -4 \\ 1 & -1 & -1 & 1 & 1 & -1 & -1 & 1 \\ 3 & -5 & 1 & 4 & -4 & -1 & 5 & -3 \\ 5 & -12 & 12 & -5 & -5 & 12 & -12 & 5 \\ 1 & -3 & 4 & -5 & 5 & -4 & 3 & -1 \end{bmatrix} \quad (4)$$

the matrix ($C^{-1}A$) is given by the following expression (5):

$$\begin{bmatrix} .9996 & -.0129 & .0055 & -.0132 & .0132 & -.0065 & .0140 & .0004 \\ -.0065 & .9996 & .0132 & .0140 & -.0129 & -.0132 & .0004 & .0055 \\ .0140 & -.0312 & .9996 & .0055 & -.0065 & .0004 & .0132 & -.0129 \\ .0132 & .0055 & .0140 & .9996 & .0004 & -.0129 & -.0065 & -.0132 \\ -.0132 & -.0065 & -.0129 & .0004 & .9996 & .0140 & .0055 & .0132 \\ -.0129 & .0132 & .0004 & -.0065 & .0055 & .9996 & -.0132 & .0140 \\ .0055 & .0004 & -.0132 & -.0129 & .0140 & .0132 & .9996 & -.0065 \\ .0004 & .0140 & -.0065 & .0132 & -.0132 & .0055 & -.0129 & .9996 \end{bmatrix} \quad (5)$$

Consequently, where the transform matrix of reversible discrete cosine transform is the expression (4) above, the matrix given by the expression (5) above is used for estimation of an error.

As an example, a result of an examination regarding the compatibility performed using the reversible moving picture coding systems of the embodiments of the present invention described above is described. An error of a decoded picture where reversible discrete cosine transform was used for coding and conventional discrete cosine transform was used for decoding was examined.

A picture signal used was of the 720×480 pixels, the 4:2:2 format and the 150 frames. For coding, basically an algorithm of the MPEG-2 was used with the discrete cosine transform thereof replaced by the reversible discrete cosine transform described above. Further, transform coefficients obtained by the reversible discrete cosine transform were not quantized, or in other words, the quantization step size was 1. In this instance, the specifications of the MPEG-2 were not satisfied in regard to the generated code amount. In decoding, an ordinary algorithm of the MPEG-2 which employs conventional inverse discrete cosine transform was used. It is to be noted that the distance between core pictures (I and/or P pictures) was M=3 (two B pictures are inserted between I and/or P pictures), and the number of frames in a picture group (GOP; Group of Pictures) was N=15.

Figure 6:
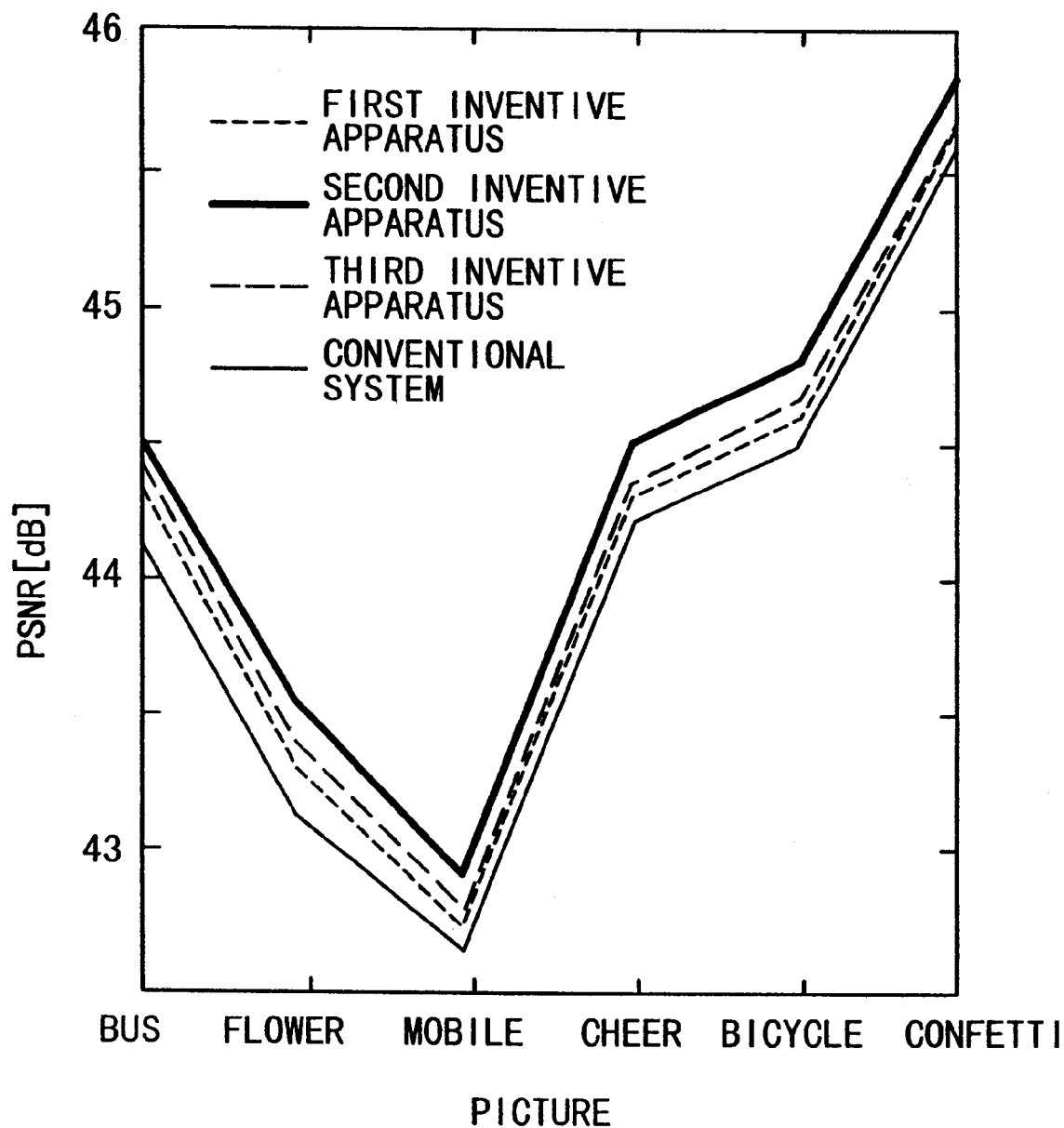
FIG. 6 is a graph illustrating augmentation of the picture quality of a decoded picture when reversible discrete cosine transform is used for coding and ordinary inverse discrete cosine transform is used for decoding in accordance with the present invention.
Figure 7:
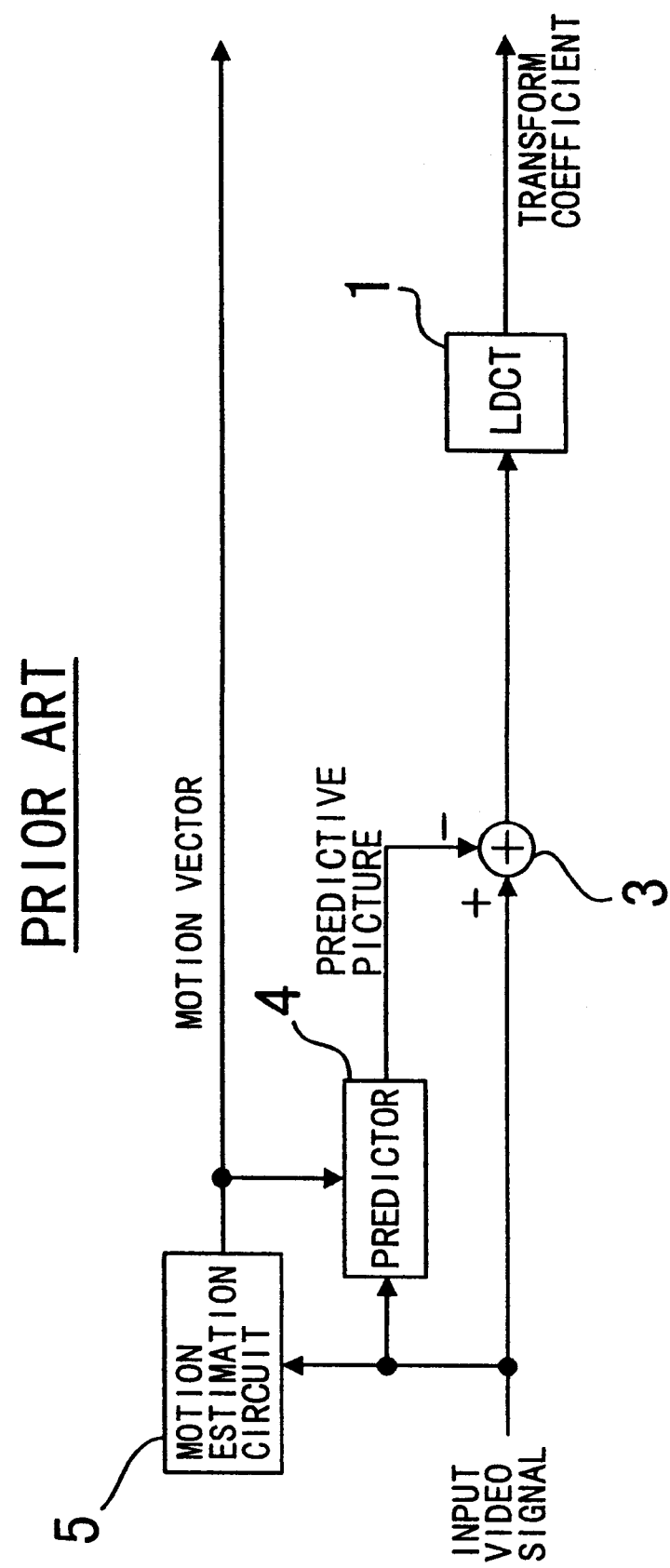
FIG. 7 is a block diagram showing a construction of an encoder which employs reversible discrete cosine transform.
Figure 8:
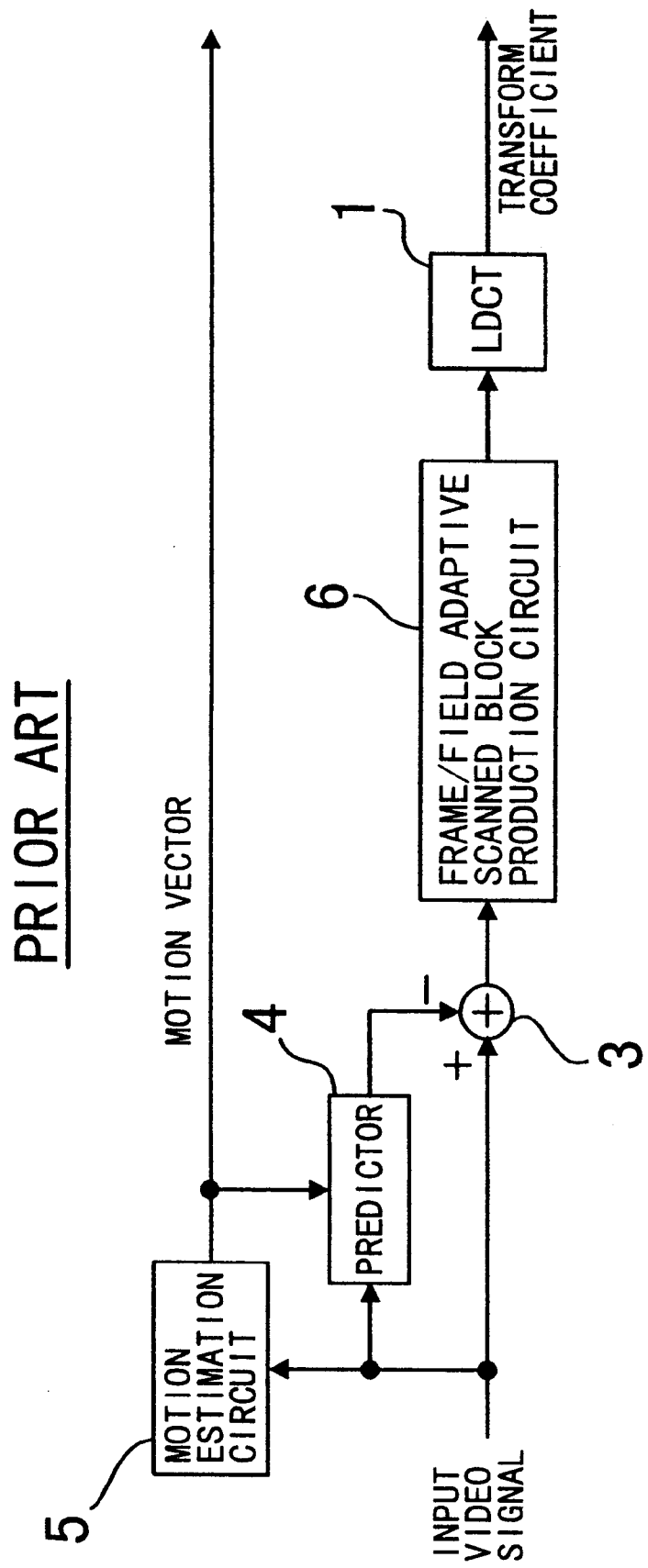
FIG. 8 is a block diagram showing an encoder in which a conventional selection circuit which adaptively selects one of frame discrete cosine transform and field discrete cosine transform is incorporated.

Average values of PSNR (Peak Signal to Noise Ratio) values of decoded pictures obtained in such a manner as described above over 150 frames (120 frames for the picture "Confetti") are illustrated in FIG. 6.

From FIG. 6, it can be seen that the reversible moving picture coding systems of the first to third embodiments described above exhibit augmented picture qualities comparing with that obtained by the conventional system. The reversible moving picture coding system of the second embodiment exhibits the highest augmentation. In the reversible moving picture coding system of the second embodiment, reversible discrete cosine transform is actually performed for both of a frame-scanned block and a field-scanned block, and that scanning which exhibits a higher augmentation in decoded picture quality is selected. Consequently, while the reversible moving picture coding system of the second embodiment requires the largest amount of calculation among the reversible moving picture coding systems of the first to third embodiments, it exhibits the highest picture quality.

The reversible moving picture coding system of the third embodiment exhibits the second highest decoded picture quality. In the reversible moving picture coding system of the third embodiment, in place of actually performing reversible discrete cosine transform for both of a frame-scanned block and a field-scanned block, a decoding predictive error is estimated by approximation calculation. Since approximation calculation is involved in this manner, although the reversible moving picture coding system of the third embodiment exhibits a degree somewhat inferior to that of the reversible moving picture coding system of the second embodiment which is the best choice, it exhibits a reduced calculation amount.

The reversible moving picture coding system of the first embodiment exhibits the third best decoded picture quality. In the reversible moving picture coding system of the first embodiment, calculation is simplified by employing approximation up to the step in which a predictive picture is produced in the reversible moving picture coding system of the third embodiment. Consequently, while the reversible moving picture coding system of the first embodiment exhibits the lowest degree of augmentation among the reversible moving picture coding systems of the first to third embodiments, it involves the least amount of calculation among them.

While preferred embodiments of the present invention have been described using specific terms, such description is for illustrative purposes only, and it is to be understood that changes and variations may be made without departing from the spirit or scope of the following claims.

What is claimed is:

1. A reversible moving picture coding system, comprising:
    means for determining a motion vector from an interlaced scanned input video signal;
    means for producing a motion compensated predictive picture from a picture for reference using the motion vector;
    means for subtracting the motion compensated predictive picture from the input video signal to produce a predictive error picture;
    means for producing a frame-scanned block and a field-scanned block from the predictive error signal;

means for estimating an error amount when reversible discrete cosine transform is performed for the frame-scanned block and then ordinary inverse discrete cosine transform is performed for the resultant block on the decoding side and outputting the estimated error amount as an estimated error amount for a frame-scanned block;

means for estimating an error amount when reversible discrete cosine transform is performed for the field-scanned block and then ordinary inverse discrete cosine transform is performed for the resultant block on the decoding side and outputting the estimated error amount as an estimated error amount for a field-scanned block;

means for comparing the estimated error amount for the frame-scanned block and the estimated error amount for the field-scanned block with each other to produce a scan selection signal and outputting the scan selection signal;

means for selecting one of the frame-scanned block and the field-scanned block in accordance with the scan selection signal and outputting the selected scanned block as an adaptive-scanned block; and means for performing reversible discrete cosine transform for the adaptive-scanned block to produce an adaptive-scan transform coefficient block.

* * * * *